United States Patent
Wood

(10) Patent No.: US 7,281,686 B2
(45) Date of Patent: Oct. 16, 2007

(54) WINDOW ASSEMBLY FOR AIRCRAFT FUSELAGE

(75) Inventor: Jeffrey H. Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 96 days.

(21) Appl. No.: 11/264,899

(22) Filed: Nov. 2, 2005

(65) Prior Publication Data

US 2007/0181746 A1    Aug. 9, 2007

(51) Int. Cl.
*B64C 1/14*       (2006.01)
*E06B 7/00*       (2006.01)
*E06B 3/00*       (2006.01)
*E04C 2/54*       (2006.01)

(52) U.S. Cl. .............. 244/129.3; 244/129.1; 244/119; 52/204.593; 52/786.1; 52/786.12; 428/34

(58) Field of Classification Search ............. 244/129.3, 244/129.1, 121, 119, 129.4; 52/204.593, 52/209, 786.1, 788.1, 202, 203, 786.12; 428/34; 49/471; 454/81, 82, 156, 198
See application file for complete search history.

(56) References Cited

U.S. PATENT DOCUMENTS

| | | | | |
|---|---|---|---|---|
| 2,189,388 A * | 2/1940 | Zand | ............................. | 52/208 |
| 2,302,740 A * | 11/1942 | Boicey | .................... | 52/204.52 |
| 2,332,060 A * | 10/1943 | Colleran | ..................... | 52/171.2 |
| 2,575,757 A * | 11/1951 | Hardy | .......................... | 52/202 |
| 2,602,970 A * | 7/1952 | Gouge | ............................. | 52/1 |
| 3,906,669 A * | 9/1975 | Vorguitch | ..................... | 49/372 |
| 4,567,703 A * | 2/1986 | Ricks | ....................... | 52/204.52 |
| 4,592,179 A * | 6/1986 | Boutarin | ....................... | 52/172 |
| 5,884,865 A * | 3/1999 | Scherer et al. | ............ | 244/129.3 |
| 5,988,566 A * | 11/1999 | Meyer | ....................... | 244/129.3 |
| 6,168,112 B1 * | 1/2001 | Mueller et al. | ........... | 244/129.3 |
| 6,450,451 B1 * | 9/2002 | Godfrey et al. | ........... | 244/129.3 |
| 6,889,938 B1 * | 5/2005 | Nordman | .................. | 244/129.3 |

OTHER PUBLICATIONS

U.S. Appl. No. 11/143,287, Sealed Structural Passenger Window Assembly and Method of Forming Same, Chris H. Balsillie, Donald P. Matheson, Jeffrey P. Sandys and Shawn M. Pare, 33 pages, filed Jun. 2, 2005.
Pending U.S. Appl. No. 10/262,361, filed Oct. 28, 2005, inventor Jeffrey H. Wood, 69 pages.

* cited by examiner

*Primary Examiner*—Teri Pham Luu
*Assistant Examiner*—Joshua Michener
(74) *Attorney, Agent, or Firm*—Wildman, Harrold, Allen & Dixon LLP

(57) ABSTRACT

A window assembly for an aircraft fuselage comprises an exterior transparent panel and an interior transparent panel positioned in an opening of the fuselage. At least one of the transparent panels may be relatively lightweight and the exterior transparent panel may be spaced apart from and in overlying relationship with the interior transparent panel. To ameliorate pressure build up in the spaced apart area, a pressure modulator, such as a vent, may be provided.

15 Claims, 6 Drawing Sheets

WINDOW ASSEMBLY FOR AIRCRAFT FUSELAGE

FIELD OF INVENTION

This invention relates to window assemblies and more particularly to window assemblies used in an aircraft fuselage.

BACKGROUND

Aircraft typically include openings in a fuselage for a plurality of windows. Commercial airplanes, for example, include a plurality of windows within the fuselage for passengers to look through during flight. These windows often employ heavy support structures to secure them to the fuselage. Since minimizing the weight of an aircraft advantageously increases fuel efficiency and the cargo load that can be carried by the aircraft, it would be desirable to utilize a relatively lightweight window assembly.

SUMMARY OF THE INVENTION

The present invention relates to an improved window assembly for use with an aircraft fuselage. The window assembly comprises at least one transparent panel. The at least one transparent panel may comprise a density between about 0.025 pounds per cubic inch to about 0.50 pounds per cubic inch and weigh between about 1.0 pound and 3.0 pounds. The at least one transparent panel may be constructed of a transparent thermoplastic polymer, such as polycarbonate, polyacrylate or mixtures thereof and may be positioned in general alignment with an external surface of the aircraft fuselage. As used herein, the term "panel" means any structure that can be inserted into an opening in an aircraft fuselage.

In one embodiment, the window assembly of the present invention comprises an exterior transparent panel covering at least a portion of an opening in the aircraft fuselage, an interior transparent panel positioned in a spaced apart relationship with the exterior transparent panel and overlying at least a portion of the exterior transparent panel. The spaced apart relationship defines a space between the exterior and interior transparent panels. The window assembly further comprises a pathway in communication with the space and the atmosphere outside the aircraft fuselage. The pathway may travel through a pressure modulator or vent comprising a deflectable center portion and one or more slits openable to an area the aircraft fuselage. As used herein, the term pathway means an opening or area through which air may travel and the term vent means a device with a closed position and an open position, where the open position allows the escape of a gas, such as air, from one area to another.

In another embodiment, the window assembly of the present invention comprises an exterior transparent panel covering at least a portion of an opening in the aircraft fuselage, an interior transparent panel overlying at least a portion of the exterior transparent panel and a vent secured to at least one of the exterior and interior transparent panels.

In still another embodiment, the window assembly comprises an exterior transparent panel covering at least a portion of an opening in the aircraft fuselage and an interior transparent panel overlying at least a portion of the exterior transparent panel, the interior transparent panel being constructed to withstand a greater load bearing force than the exterior transparent panel.

BRIEF DESCRIPTION OF THE DRAWINGS

Certain embodiments of the presently claimed invention are illustrated by the accompanying figures. It should be understood that the figures are not necessarily to scale and that details that are not necessary for an understanding of the invention or that render other details difficult to perceive may be omitted. It should be understood, of course, that the invention is not necessarily limited to the particular embodiments illustrated herein.

DETAILED DESCRIPTION

The window assembly of the present invention comprises at least one transparent panel associated with an opening in an aircraft fuselage. In certain embodiments, the transparent panel is relatively lightweight, constructed of a material comprising a density between about 0.025 pounds per cubic inch to about 0.60 pounds per inch and more particularly between about 0.040 pounds per cubic inch to about 0.045 pounds per inch. In other embodiments, the window assembly comprises an exterior transparent panel and an interior transparent panel, one or both of which cover at least a portion of an opening in an aircraft fuselage.

Figure 1:
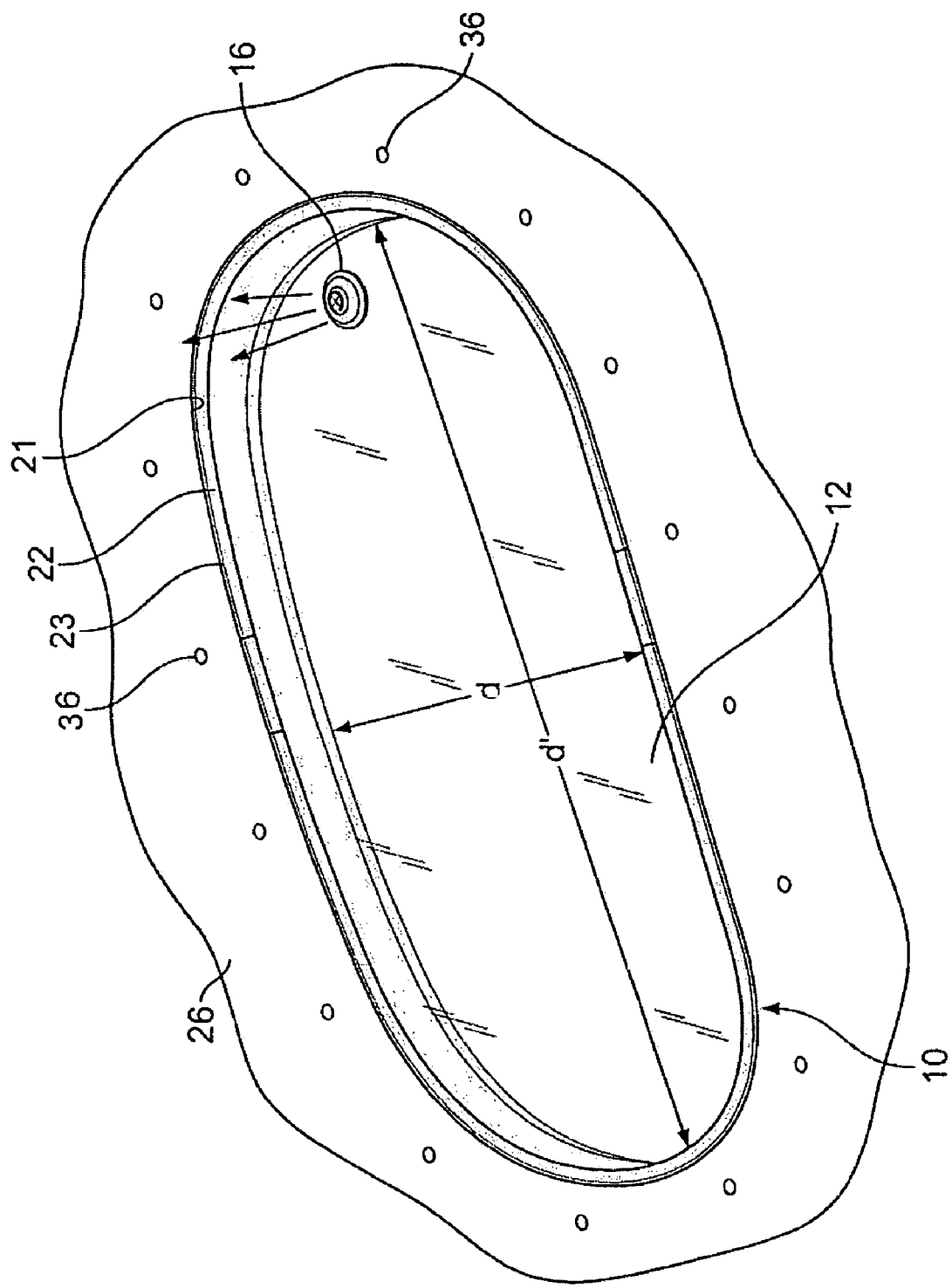
FIG. 1 is a perspective view of one embodiment of the window assembly according to the present invention.
Figure 2:
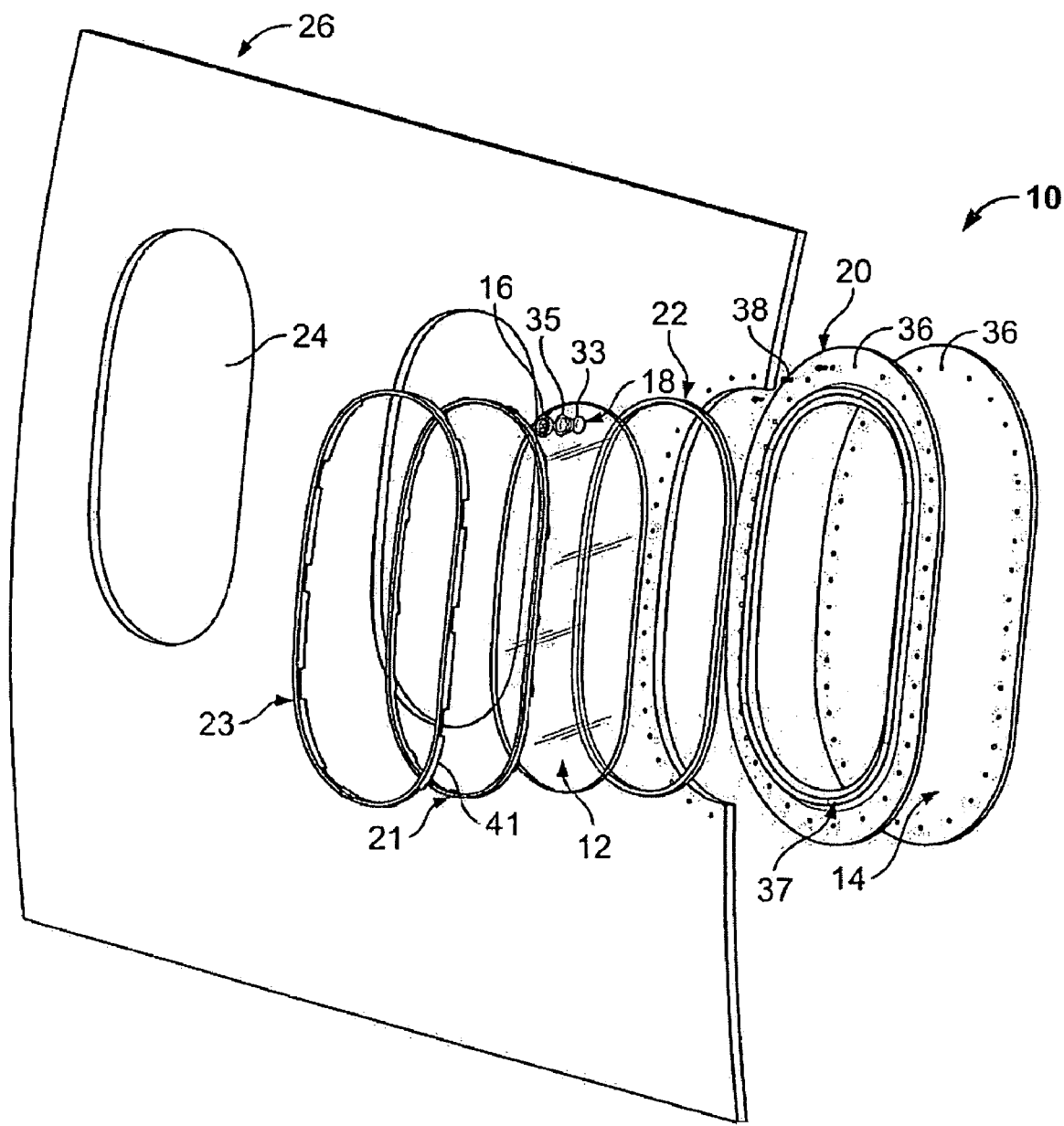
FIG. 2 is an exploded unassembled perspective view of the window assembly of FIG. 1.

Referring now to FIGS. 1 and 2, one embodiment of the window assembly 10 of the present invention is shown. The window assembly 10 of FIGS. 1 and 2 comprises exterior transparent panel 12, interior transparent panel 14, pressure modulator 16, pathway 18, retaining fitting 20, retaining frame 21, inner seal 22 and outer seal 23. As best shown by FIG. 2, window assembly 10 may be secured to opening 24 in aircraft fuselage 26.

Exterior transparent panel 12 may comprise an external surface positioned in general alignment with a portion of an external surface of aircraft fuselage 26. This transparent panel is typically aerodynamic and constructed of a transparent thermoplastic polymer. The thermoplastic polymer may be relatively lightweight, exhibiting a density between about 0.025 pounds per cubic inch to about 0.60 pounds per cubic inch and more particularly between about 0.040 pounds per cubic inch to about 0.045 pounds per cubic inch. For example, polycarbonates, thermoplastic polymers or copolymers of acrylic acid, methacrylic acid, esters of these acids or acrylonitrile, as well as other suitable polymers known to those of skill in the art may be employed.

Depending on its dimensions, therefore, the total weight of exterior transparent panel 12 may be between about 1.0 pound and 3.0 pounds and more particularly between about 1.25 pounds and 1.75 pounds. Transparent panel 12, which is typically oval in shape, may comprise first diameter d between about 10.0 inches to about 15.0 inches and second diameter d' between about 18.0 inches to about 24.0 inches and more particularly first diameter d between about 12.0 inches and about 14.0 inches and second diameter d' between about 20.0 inches and 22.0 inches. The configuration and lightweight aspect of exterior transparent panel 12 of this embodiment advantageously provides a weight savings aboard the aircraft.

Figure 4A:
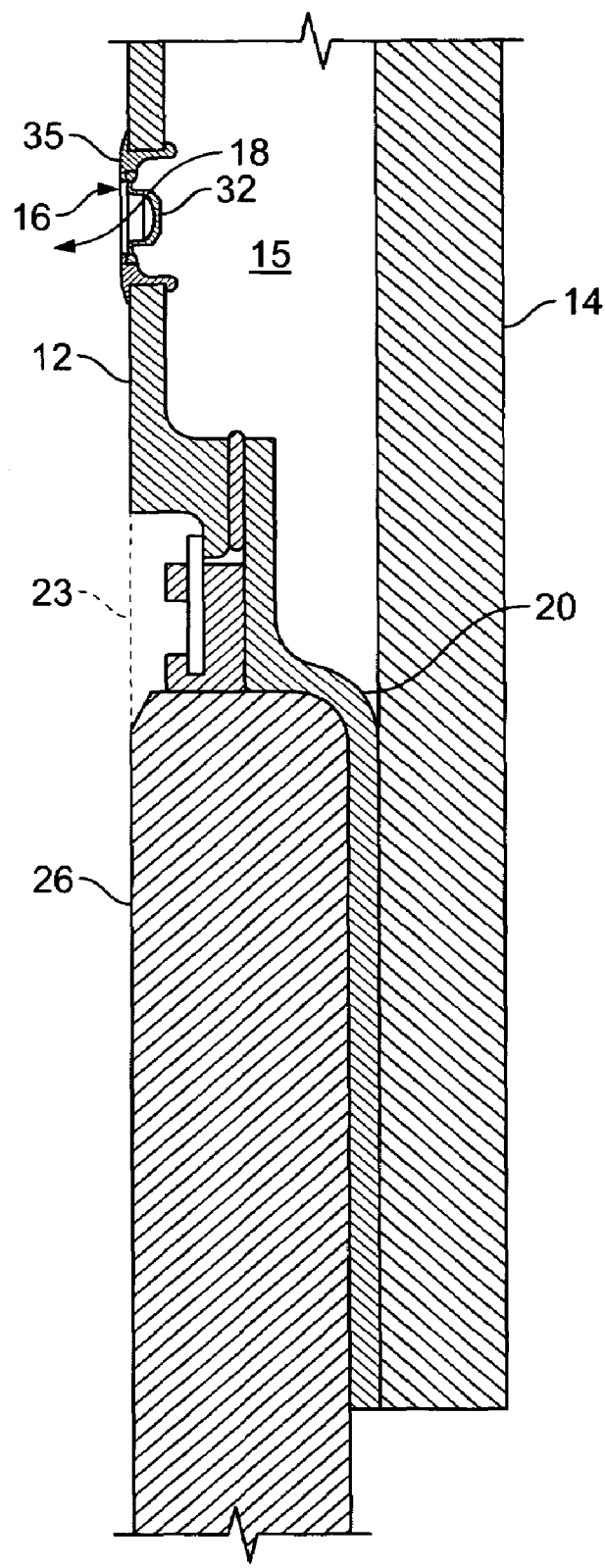
FIG. 4A is a partial cross-sectional view of one embodiment of the exterior transparent panel of the present invention in place on an aircraft fuselage, with the vent of FIG. 3 in a closed position.

Interior transparent 14 panel may overly at least a portion of exterior transparent panel 12. In certain embodiments, interior transparent panel 14 may be constructed to withstand a greater load bearing force than exterior transparent panel 12. For example, interior transparent panel 12 can withstanding a load bearing force of between about 14.0 pounds per square inch and about 20.0 pounds per square inch, while exterior transparent panel 12 may be constructed to withstand a load bearing force of up to about 4.0 pounds per square inch and more particularly up to about 2.5 pounds per square inch. Further, transparent panels 12 and 14 may be positioned in a spaced apart relationship with one another, defining space 15, as shown in FIGS. 4A and 4B.

During flight, a pressure differential within space 15 and an area outside space 15, such as the atmosphere outside the fuselage 26, may arise. For example, at high altitudes, a pressure of about 15.0 pounds per square inch exists inside space 15 while pressures of about 2.0 pounds per square inch exists outside aircraft fuselage 26. Since the pressure differential can lead to breakage of the transparent panels as well as other unwanted effects, the present invention further provides effective ways to ameliorate the aforementioned pressure differential.

Figure 4B:
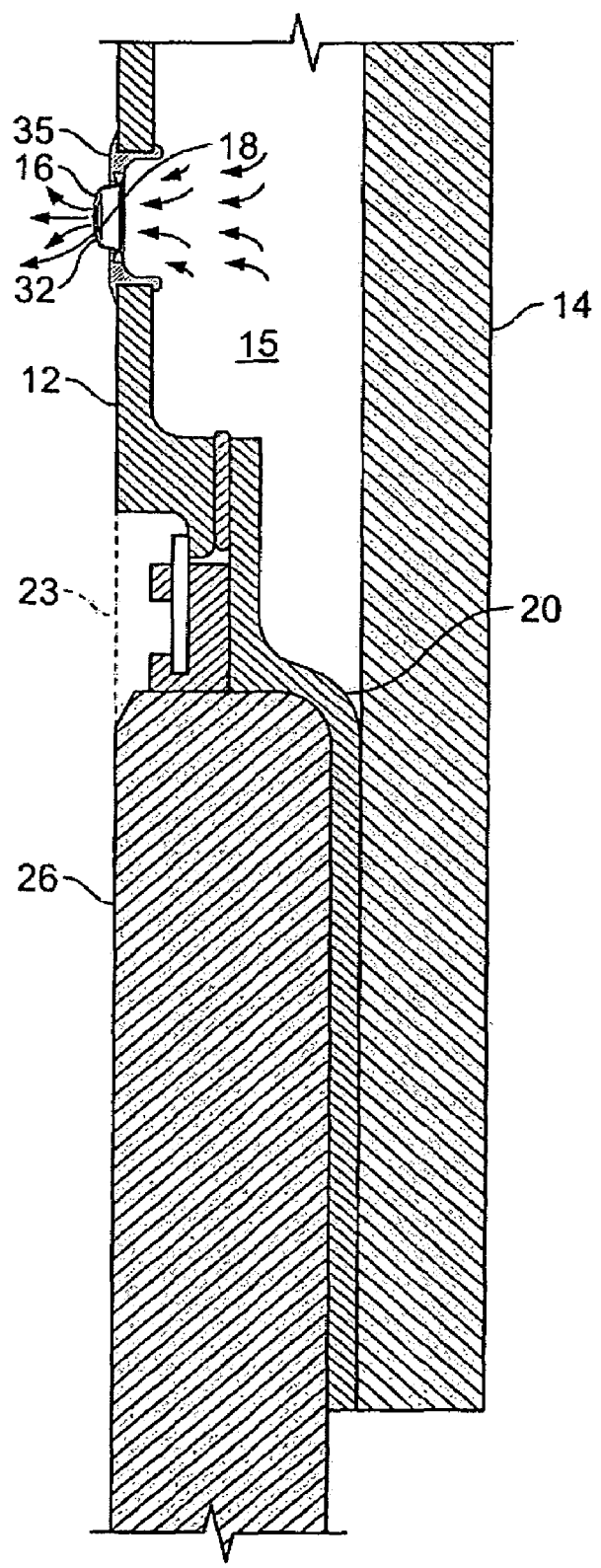
FIG. 4B is a partial cross-sectional view of one embodiment of the window assembly of the present invention in place on an aircraft fuselage with the vent of FIG. 3 in an open position.

In one embodiment, shown in FIG. 4B, a pathway 18 in communication with space 15 and with the atmosphere of fuselage 26 is provided. Pathway 18 allows pressure built up inside space 15 to release into an area of lower pressure (e.g., the atmosphere outside the aircraft), as shown by the arrows in FIG. 4B. Pathway 18 may include a pressure modulator 16 for regulating the release of pressure from space 15. Pressure modulator is typically positioned on exterior transparent panel 12. As used herein, the term pressure modulator means any device or structure that allows for the release of pressure from one area to another.

Figure 3:
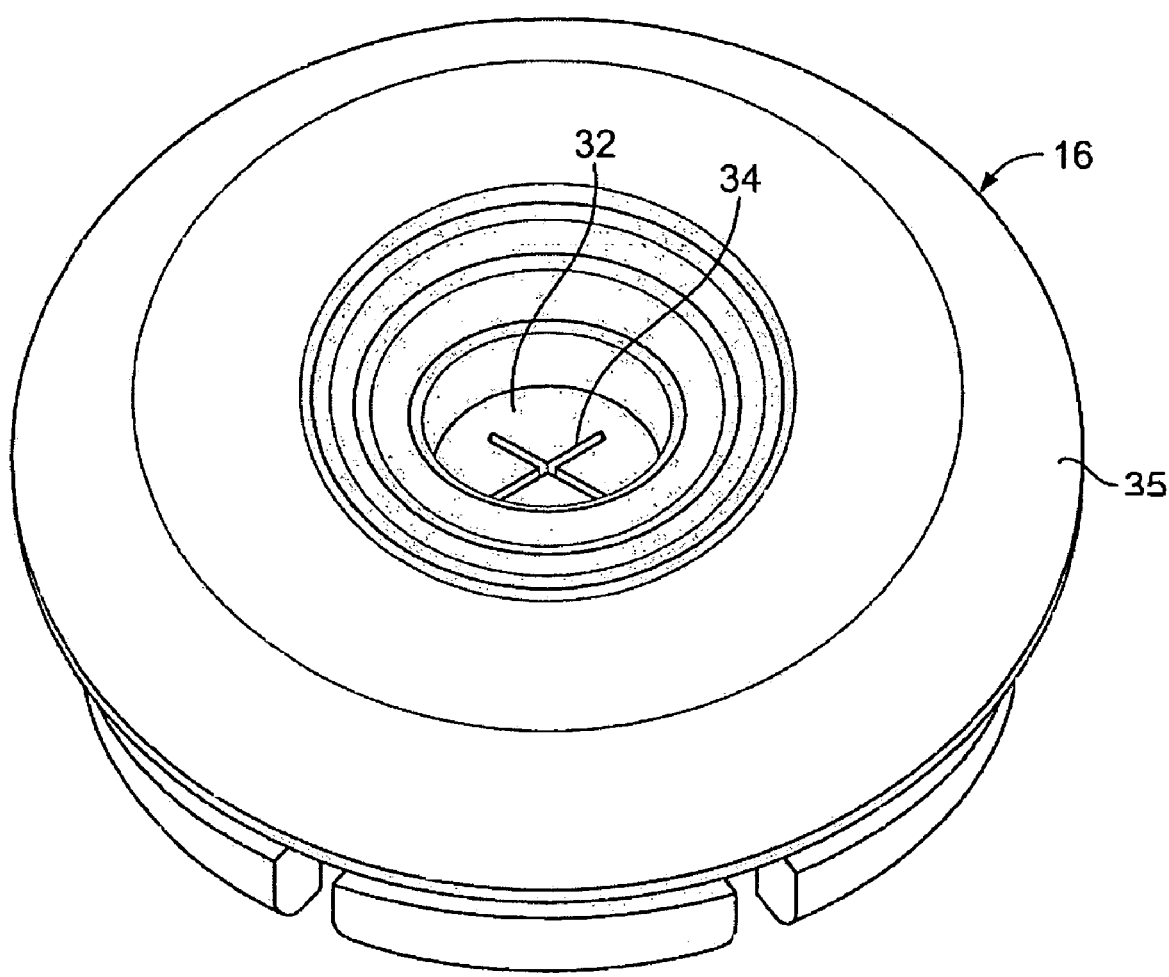
FIG. 3 is an enlarged perspective view of one embodiment of a vent used with the window assembly of the present invention.

For example, a vent may serve as pressure modulator 16. As shown in FIG. 3, vent 16 may comprise annular surface 30 with deflectable center 32, which comprises one or more slits 34. The one or more slits 34 are predisposed to a closed position until a pressure differential occurs from one side of vent 16 to the other, causing deflectable center 32 to push the one or more slits 34 into their open position. Under these circumstances, the pressure in space 15 may be released into an area outside an external surface of aircraft fuselage 26, thereby creating approximate pressure equalization on both sides of vent 16. Vent 16 can be engineered to open at predetermined pressure differentials to minimize pressure loads on exterior and interior transparent panels 12 and 14.

Vent 16 may be secured to one of exterior and interior transparent panels 12 and 14 in a variety of ways. Vent 16 may, for example, be self-supporting within a small aperture 33 positioned in exterior transparent panel 12. Additionally or alternatively, vent 16 may comprise a retaining housing 35 for securing vent 16 within the small aperture 33. Small aperture 33 is typically positioned near the top of exterior transparent panel 12 (but may be positioned anywhere on panel) and is adapted to receive vent 16 and/or retaining housing 35.

Vent 16 and/or retaining housing 35 may also incorporate a fail-safe feature. In one embodiment, retaining housing 35 is configured to fail at a predetermined pressure build-up. In the event vent 16 becomes plugged and fails to appropriately vent pressure, the predetermined pressure build-up would blow out the retaining housing 35 from the small aperture in exterior transparent panel 12, taking vent 16 with it. In this way, approximate pressure equalization on both sides of exterior transparent panel 12 helps prevent exterior transparent panel 12 from shattering and departing aircraft fuselage 26. Further, vent 26 may easily be replaced after landing.

Figure 5:
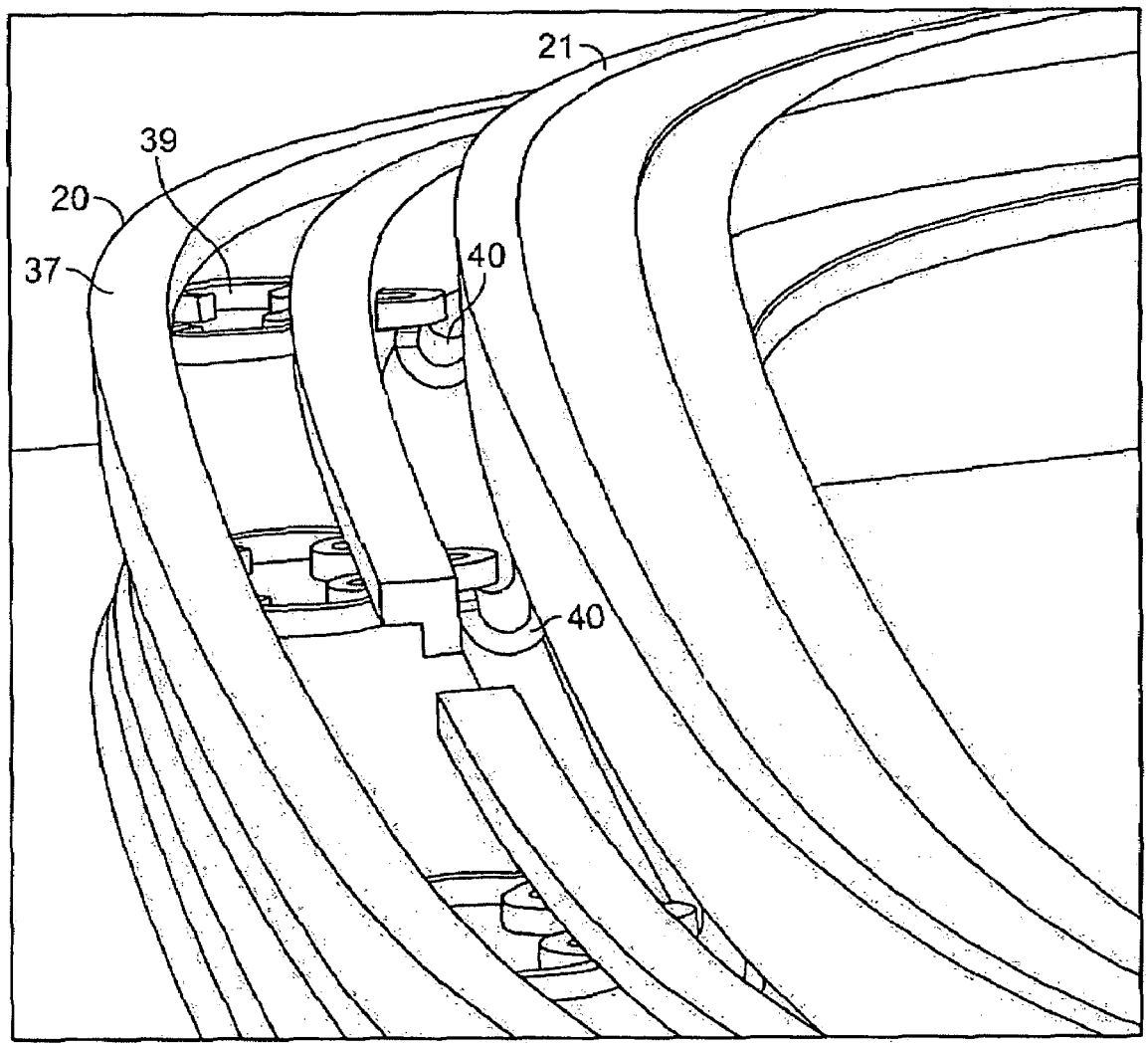
FIG. 5 is a partial perspective enlarged view of the retaining frame and the retaining fitting according to one embodiment of the window assembly of the present invention.

Retaining fitting 20, retaining frame 21 and outer seal 23 may be designed to work together. As shown in FIGS. 2 and 5, retaining fitting 20 may comprise a plurality of preformed openings 36, channel 37 and spring clips 39. Retaining frame 21 may comprise corresponding hooks 40, which are adapted to mate with the spring clips 39 to secure retaining fitting 20 to frame 21. Finally, outer seal 23 may comprise a plurality of projections 41 for insertion into channel 37.

The various components of window assembly 10 can be made in different ways. Exterior transparent panel 12 can be injected molded, compression molded or machined and polished. One or both of exterior and interior transparent panels 12 and 14 may be constructed of tempered glass or the transparent thermoplastic polymer mentioned hereinabove. Retaining fitting 20 and outer seal 22 are also typically injection molded. As shown in FIGS. 1 and 2, interior transparent panel 14 and retaining fitting 20 are formed with a plurality of preformed openings 36 spaced circumferentially around the perimeters. One embodiment of vent 16 is available from Liquid Molding Systems of Midland Michigan Vent retaining housing 35 can be bonded to vent 16 or comprise a ring fitting or holding vent 16. Vent retaining housing 35 can be made by injection molding.

To assemble window assembly 10, preformed openings 36 in interior transparent panel 14, retaining fitting 20 and aircraft fuselage 26 are aligned and secured together with fastening elements 38. Inner seal 22 is positioned within retaining fitting 20, with exterior transparent panel 12 placed over inner seal 22. Retaining frame 21 may next be positioned over inner seal 22, with hooks 40 of retaining frame 21 engaging spring clips 39 of retaining fitting 20. Finally, outer seal 23 is placed over retaining frame 21 so that its projections 41 are positioned within channel 37. Additional details concerning how to assemble the window assembly of the present invention may be found in the co-owned, co-pending application, entitled "Window Assembly Retaining System."

Variations, modifications and other implementations of what is described herein will occur to those of ordinary skill in the art without departing from the spirit and scope of the invention. Accordingly, the invention is in no way limited by the preceding illustrative description.

I claim:
1. A window assembly for an aircraft fuselage comprising:
   an exterior transparent panel covering at least a portion of an opening in the aircraft fuselage;
   an interior transparent panel positioned in a spaced apart relationship with the exterior transparent panel and overlying at least a portion of the exterior transparent panel, wherein the spaced apart relationship defines a space between the exterior and interior transparent panels;

a pathway in the exterior panel, wherein said pathway is in direct communication with the space and the atmosphere outside the aircraft fuselage and;

a pressure modulator secured to the pathway which is adapted to remain closed until a pre-determined pressure differential occurs between a pressure in the space and a pressure of the atmosphere at which time the pressure modulator is adapted to open to release the pressure in the space directly to the atmosphere.

2. The window assembly of claim 1, wherein a retaining housing secures the pressure modulator to the pathway of the exterior transparent panel, and the retaining housing is adapted to fail at a predetermined pressure within the space at which time the pressure within the space will blow out both the retaining housing and the pressure modulator from the passageway.

3. The window assembly of claim 1, wherein the exterior transparent panel comprises a density between about 0.25 pounds per cubic inch to about 0.60 pounds per cubic inch.

4. The window assembly of claim 1, wherein the pressure modulator comprises a vent having a deflectable center portion and one or more slits.

5. The window assembly of claim 1, wherein a surface of the exterior transparent panel is positioned in general alignment with an external surface of the aircraft fuselage.

6. The window assembly of claim 1, wherein the exterior transparent panel comprises a weight between about 1.0 pounds and 3.0 pounds.

7. The window assembly of claim 1, wherein the exterior transparent panel comprises a transparent thermoplastic polymer.

8. The window assembly of claim 7, wherein the transparent thermoplastic polymer is at least one of polycarbonates, polyacrylates and mixtures thereof.

9. The window assembly of claim 1, wherein the interior transparent panel is constructed to withstand a greater load bearing force than the exterior transparent panel.

10. The window assembly of claim 9, wherein the interior transparent panel is constructed to withstand a force of between about 14.0 pounds per square inch and about 20.0 pounds per square inch.

11. The window assembly of claim 9, wherein the exterior transparent panel is constructed to withstand a force of between about 2.5 pounds per square inch and about 4.0 per square inch.

12. A method of modulating pressure in an aircraft window assembly comprising:

providing an aircraft window assembly comprising: an exterior transparent panel covering at least a portion of an opening in an aircraft fuselage; an interior transparent panel positioned in a spaced apart relationship with the exterior transparent panel and overlying at least a portion of the exterior transparent panel, wherein the spaced apart relationship defines a space between the exterior and interior transparent panels; a pathway in the exterior panel in communication with the space and the atmosphere outside the aircraft fuselage and; a pressure modulator secured to the pathway;

keeping the pressure modulator closed as long as a pressure differential between a pressure in the space and a pressure of the atmosphere is below a pre-determined pressure differential; and opening the pressure modulator when the pressure differential between the pressure in the space and the pressure in the atmosphere reaches the pre-determined pressure differential.

13. The method of claim 12 wherein the window assembly further comprises a retaining housing which secures the pressure modulator to the pathway of the exterior transparent panel.

14. The method of claim 13 further comprising the step of blowing out the retaining housing and the pressure modulator from the passageway when the pressure differential reaches a second pre-determined pressure differential.

15. The method of claim 12 wherein the pressure modulator comprises a vent having a deflectable center portion and one or more slits.

* * * * *